(12) United States Patent
Michelot et al.

(10) Patent No.: US 6,286,574 B1
(45) Date of Patent: Sep. 11, 2001

(54) DEVICE FOR MOTOR VEHICLE RUNNING FLAT AND METHOD FOR MOUNTING

(75) Inventors: Eric Michelot, Cergy; Alain Lelievre, Fresnoy en Thelle; Bruno Pelletier, Villers-sous-Saint-Leu; Eric Carpentier, Champagne-sur-Oise, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/331,192

(22) PCT Filed: Oct. 30, 1998

(86) PCT No.: PCT/FR98/02330

§ 371 Date: Sep. 2, 1999

§ 102(e) Date: Sep. 2, 1999

(87) PCT Pub. No.: WO99/22953

PCT Pub. Date: May 14, 1999

(30) Foreign Application Priority Data

Oct. 30, 1997 (FR) .................................................. 97 13618
Apr. 6, 1998 (FR) .................................................. 98 04225

(51) Int. Cl.[7] .................................................. B60C 17/04
(52) U.S. Cl. .................. 152/381.6; 152/400; 152/520
(58) Field of Search .......................... 152/381.5, 381.6, 152/384, 400, 516, 520

(56) References Cited

U.S. PATENT DOCUMENTS

| | | | |
|---|---|---|---|
| 1,343,685 | * 6/1920 | Runyan | 152/400 X |
| 2,040,645 | * 5/1936 | Dickenson | 152/520 |
| 4,183,388 | * 1/1980 | Cassidy | 152/520 |
| 4,372,365 | * 2/1983 | Osada et al. | 152/520 |
| 4,374,535 | * 2/1983 | Watts | 152/381.6 |
| 4,393,911 | * 7/1983 | Winfield | 152/516 |
| 4,461,333 | * 7/1984 | Filliol et al. | 152/400 X |
| 4,662,419 | * 5/1987 | Winfield | 152/400 X |
| 4,722,377 | * 2/1988 | Dobson | 152/520 |
| 4,776,377 | * 10/1988 | Susini et al. | 152/400 X |
| 4,854,356 | * 8/1989 | Koutsoupidis | 152/520 X |
| 5,435,363 | * 7/1995 | Pender | 152/520 |
| 5,479,976 | * 1/1996 | Cho | 152/518 |

* cited by examiner

*Primary Examiner*—Russell D. Stormer
(74) *Attorney, Agent, or Firm*—Oblon, Spivak, McClelland, Maier & Neustadt, P.C.

(57) ABSTRACT

A run-flat device for a motor vehicle, the device being designed to be fitted clamped on a standard rim having lateral flanges for holding the beads of a tire, wherein the device is constituted by at least two coaxial annular pieces engaged one on the other, the radially-inner piece being of relatively rigid material and forming an open ring around the rim, the radially-outer piece being based on an elastically deformable material and comprising a one-piece continuous surrounding the radially-inner annular piece and having an inside diameter that is substantially equal to or greater than the outside diameter of a lateral flange of the rim.

31 Claims, 10 Drawing Sheets

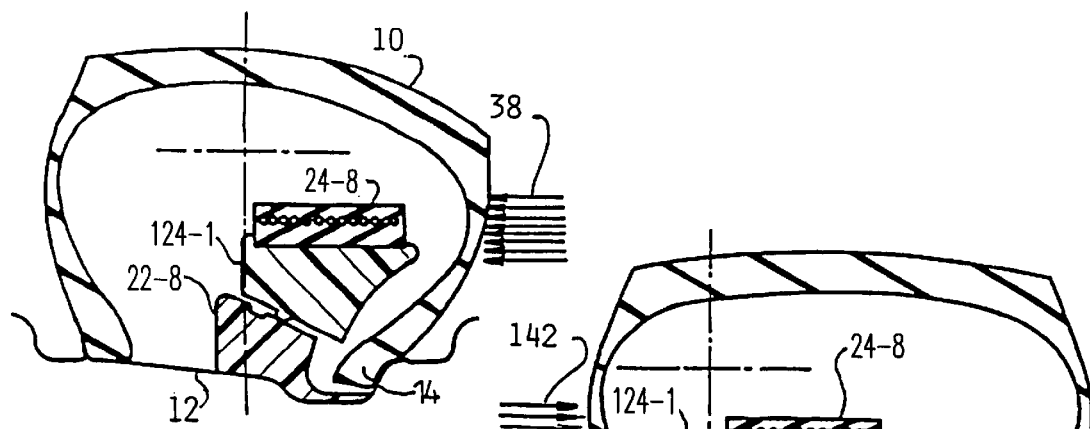
FIG. 14
FIG. 15
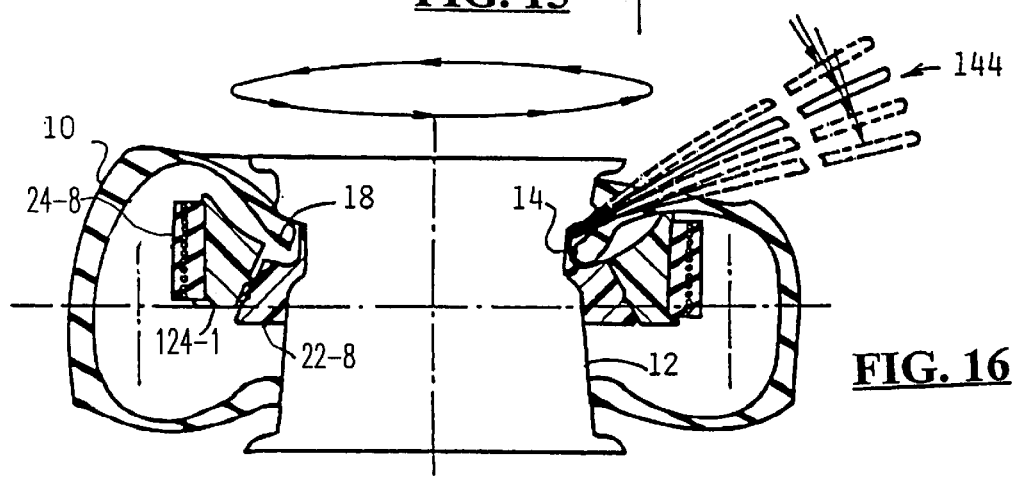
FIG. 16
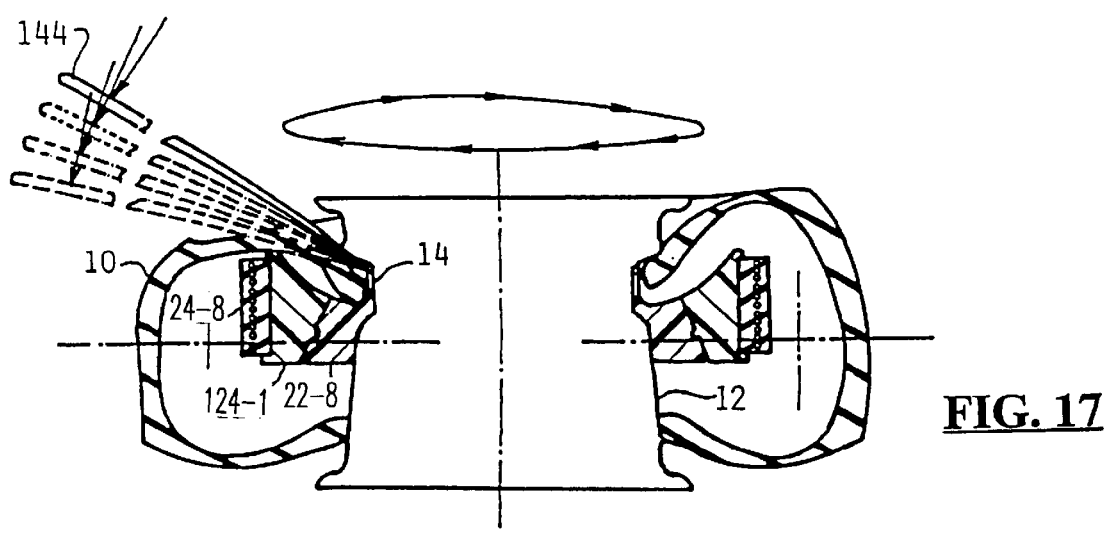
FIG. 17

DEVICE FOR MOTOR VEHICLE RUNNING FLAT AND METHOD FOR MOUNTING

The invention relates to a motor vehicle run-flat device enabling a considerable distance to be traveled (at least 100 km) at a relatively high speed (not less than 80 km/h) with a tire that is partially or completely deflated. The invention also relates to a method of fitting the device.

BACKGROUND OF THE INVENTION

Known devices of this type can be of relatively simple structure when they are designed for use with rims that can be disassembled or with special rims, however when they are to be fitted on standard rims (made as a single piece) having fixed lateral flanges for holding the beads of a tire, such devices are necessarily made of a plurality of parts each in the form of an arc of a circle, which parts are connected together end to end by mechanical link means using screws, eccentric means, etc. . . . so as to form a running ring which can be clamped onto the rim and which can be dismantled and withdrawn from the rim in spite of its lateral flanges.

These linking and clamping means are the source of considerable drawbacks since handling them is awkward and sometimes lengthy (it is necessary to place the hands and/or tools between the rim and the tire), yet such handling can be critical since poor clamping of the running ring on the rim can cause it to be destroyed quickly when running on a flat tire. Furthermore, the link means are sensitive to shock and are subjected in use to considerable forces which vary over time, thereby giving rise to fatigue phenomena that can cause them to break quite quickly, thereby destroying the run-flat device.

For fitting to mass-produced vehicles, run-flat devices must be capable of being fitted on standard wheel rims, i.e. on rims that are made as a single piece with lateral flanges.

For this purpose, devices have already been proposed that are formed by at least two circularly-arcuate elements which are connected end to end by link means, e.g. using screws, eccentrics, etc., in order to form a continuous ring which is clamped onto the rim and which can be fitted to and stripped from the rim in spite of its lateral flanges.

It has been found that such link means are often the cause of run-flat devices being destroyed prematurely for various reasons (poor clamping, sensitivity to shock, to vibration, fatigue phenomena, etc. . . . ).

OBJECTS AND SUMMARY OF THE INVENTION

A particular object of the present invention is to avoid those drawbacks.

Another object of the present invention is to provide a run-flat device of the above-specified type which is easy to fit on a standard rim without requiring special tooling.

Another object of the invention is to provide a run-flat device of the above-specified type which is easier to manufacture and assemble than are known devices of the prior art and which is more reliable.

Another object of the invention is to provide a device of this type whose performance can be guaranteed in spite of relatively slack manufacturing tolerances.

Another object of the invention is to provide a method of fitting such a device which is simpler and easier to implement.

The invention seeks to provide a motor vehicle run-flat device that can be used on a standard rim having lateral flanges for holding the beads of a tire, the device nevertheless being of a structure that is much simpler, that provides much higher performance, and that is much more reliable than known devices of the prior art.

Another object of the invention is to provide a device of this type which is easier and quicker to fit than are devices of the prior art.

To this end, the invention provides a motor vehicle run-flat device designed to be fitted so that it is clamped on a standard wheel rim having lateral flanges for holding the beads of a tire, wherein the device is constituted by at least two coaxial annular pieces engaged one on the other, the radially-inner first annular piece being of a relatively rigid material and forming an open ring around the rim, and the radially-outer second annular piece being based on an elastically deformable material and comprising a continuous one-piece ring surrounding the first piece and having an inside diameter substantially equal to or greater than the outside diameter of a lateral flange of the rim.

The device of the invention thus has the essential advantage of being completely free of any of the above-mentioned link or clamping means as used in the prior art while nevertheless being suitable for fitting on standard rims having fixed lateral flanges, with the device being assembled by engaging a continuous outer ring on an open inner ring.

The simplicity of the structure and the reliability of the device of the invention are considerably greater than those of known prior devices.

According to other characteristics of the invention, the second annular piece has an inside diameter that is slightly smaller than the outside diameter of the first piece and it is engaged by force thereon, thus ensuring that the first piece is clamped against the rim.

Advantageously, the second piece includes annular means that are substantially inextensible, e.g. embedded in the material constituting said second piece, such that when the second piece is engaged on the first, the material of said second piece is compressed between the first piece and the inextensible annular means of the second piece, thereby clamping the first piece strongly against the rim.

According to yet another characteristic of the invention, the contact surfaces between the first and second pieces are frustoconical, at least in part.

This makes it easier to center and fit the second piece on the first, and also ensures that the second piece is automatically locked on the first when running on a flat tire (providing the frustoconical surfaces flare from the outside towards the inside of the tires), since the forces which act on said pieces when running on a flat tire act from the outside towards the inside of the tires.

Finally, the device is also characterized by axial holding means for holding the second piece on the first.

Thus, once the second piece has been fitted and engaged by force on the first, it is held positively thereon, thus avoiding any risk of the two pieces accidentally separating in use.

In a first embodiment of the invention, the axial holding means can be annular grooves and ribs or the like which are formed at the interface between the first piece and the second piece.

In another embodiment, the axial holding means comprise a wedge-forming annular element between the first and second pieces, which element is held in position against these two pieces by fixing or locking means.

In another embodiment of the invention, the device includes an intermediate annular piece of relatively rigid material which forms an open ring and which is interposed between the first and second annular pieces.

This makes it possible in particular to reduce the radial thicknesses of the first piece and of the intermediate annular piece which are both made of relatively rigid material, thus making it easier to fit them on the rim.

The contact surfaces between the first piece and the intermediate piece are preferably frustoconical, at least in part, and axial holding means are provided for holding the intermediate piece on the first piece, for example annular grooves and ribs or the like formed at the interface between the first piece and the intermediate piece.

In general, the device of the invention is particularly designed for use on the wheels of private vehicles, but it can also be used on the wheels of larger vehicles, and it turns out to be particularly effective, with tests having shown that it is possible to run on a flat tire with this device even under driving conditions that are extreme.

In addition, the device is extremely insensitive to shock.

The invention also provides a method of fitting a run-flat device on a motor vehicle wheel, the device comprising at least:
  a radially-inner annular piece and an intermediate annular piece both of relatively rigid material and open at at least one point in their respective peripheries, and designed to be fitted one on the other around the rim of the wheel;
  a radially-outer annular piece that is continuous and coaxial with the two preceding pieces, said radially-outer piece being substantially inextensible and having an inside diameter greater than the outside diameter of the flange of the rim; the method consisting:
  in fitting the open radially-inner annular piece on the rim of the wheel, said radially-inner piece being prevented from moving in an axial direction relative to the rim;
  in inserting the intermediate annular piece inside the tire and in placing it around the rim in the vicinity of the radially-inner annular piece;
  in inserting the radially-outer annular piece inside the tire and in fitting it on the intermediate annular piece; and then
  in pushing the assembly constituted by the intermediate piece and the radially-outer piece onto the radially-inner piece until snap-fastening takes place, the facing annular surfaces of the radially-inner piece and of the intermediate piece being of complementary shapes, e.g. being substantially frustoconical, and including means such as annular ribs and grooves of complementary shapes, said annular surfaces co-operating mutually both to clamp the radially-inner piece against the rim and to position the intermediate piece axially on the radially-inner piece and to lock it in position.

Thus, in accordance with the invention, fitting a run-flat device comprises an operation of forced engagement of one open annular piece of relatively rigid material on another open annular piece of relatively rigid material, which can be done much more easily than forced engagement of a continues piece of elastically deformable material directly onto a piece made of relatively rigid material.

In addition, the pieces made of relatively rigid material, for example a plastics material of the polyamide type, can be made with manufacturing tolerances that are relatively small, so it is possible to dimension them in such a manner as to ensure that they interfit and so as to enable them to engage one on the other while applying relatively little force thereto.

According to another characteristic of the invention, the radially-outer annular piece has a diameter that is smaller than the outside diameter of the intermediate annular piece when it is in the free state, and the method then consists in tightening the intermediate annular piece by moving its ends towards each other prior to fitting the radially-outer annular piece on the intermediate piece around the rim of the wheel.

The ends of the intermediate annular piece can be moved together in simple manner, by using an appropriate tool such as a pair of pliers, the intermediate annular piece being dimensioned so as to have an outside diameter that is smaller than the inside diameter of the radially-outer annular piece when its ends are moved together, thereby ensuring that the radially-outer annular piece can be fitted quickly and easily on the intermediate piece.

The invention also provides a method of stripping a run-flat device of the above-specified type which is fitted on a wheel rim as specified above, the stripping method consisting:
  in pushing said intermediate annular piece in a direction opposite to the direction in which it is pushed during fitting, thereby disengaging the assembly formed by the intermediate and radially-outer annular pieces from the radially-inner annular piece;
  in tightening the intermediate annular piece;
  in disengaging the radially-outer annular piece from the intermediate piece and extracting it from the rim; and then
  in extracting the intermediate piece and the radially-inner annular piece successively from the rim.

The wall of the intermediate annular piece forms a rigid surface against which sufficient thrust can be applied to disengage the intermediate annular piece from the radially-inner piece. It is more reliable and easier to proceed in this manner than by exerting thrust initially on the radially-outer piece (which is deformable) in order to disengage it from the intermediate annular piece.

The invention also provides a motor vehicle run-flat device suitable for being fitted on a wheel or stripped therefrom by performing the above-described method, and comprising at least:
  a radially-inner annular piece and an intermediate annular piece that are both open and made of relatively rigid material, and that are designed to be fitted one on the other around the rim of the wheel; and
  a radially-outer annular piece that is continuous and substantially inextensible, being designed to be fitted on the intermediate annular piece; wherein the outer peripheral surface of the intermediate annular piece is formed with a circumferential groove or channel for receiving the radially-outer annular piece, said groove or channel being of substantially U-shaped cross-section.

This configuration of the intermediate annular piece facilitates axial positioning of the radially-outer annular piece on the intermediate piece, said positioning being defined in positive manner by the lateral walls of the above-mentioned groove or channel. The radially inner portion of the radially-outer annular piece is of a shape that matches the shape of the groove or channel, i.e. its section is substantially U-shaped, and it can be made with manufacturing tolerances that are much tighter than in the prior art.

In a preferred embodiment of the invention, the radially-outer annular piece is of substantially rectangular section.

Such a piece can be made with good dimensional accuracy by using techniques that are known for manufacturing transmission belts.

Advantageously, the radially-outer annular piece comprises two layers of rubber or the like that are of different hardnesses, the radially-inner layer of the radially-outer annular piece being, for example, less hard than the radially-outer layer, thereby making it possible to compensate and accommodate more easily any dimensional errors due to manufacturing tolerances.

According to another characteristic of the invention, said radially-outer annular piece is reversible, with the inextensible elements it contains constituting a neutral fiber.

It is then possible, if necessary, to turn it inside out so that its inside face becomes its outside face, and vice versa, in particular to accommodate a relatively large amount of manufacturing tolerance.

In general manner, the invention makes it much easier to fit and to strip motor vehicle run-flat devices, and by improving the accuracy with which such devices are installed and positioned on wheel rims, it considerably improves the reliability thereof.

BRIEF DESCRIPTION OF THE DRAWINGS

The invention will be better understood and other characteristics, details, and advantages thereof will appear more clearly on reading the following description made by way of example and given with reference to the accompanying drawings, in which:

FIGS. 12 to 15 are diagrammatic views showing how an improved variant of the device is fitted and stripped;

FIGS. 16 and 17 are diagrams showing one way of fitting an improved variant of the device of the invention on a wheel rim;

In FIGS. 1 to 25, the same references are used to designate the same elements.

MORE DETAILED DESCRIPTION

Figure 1:
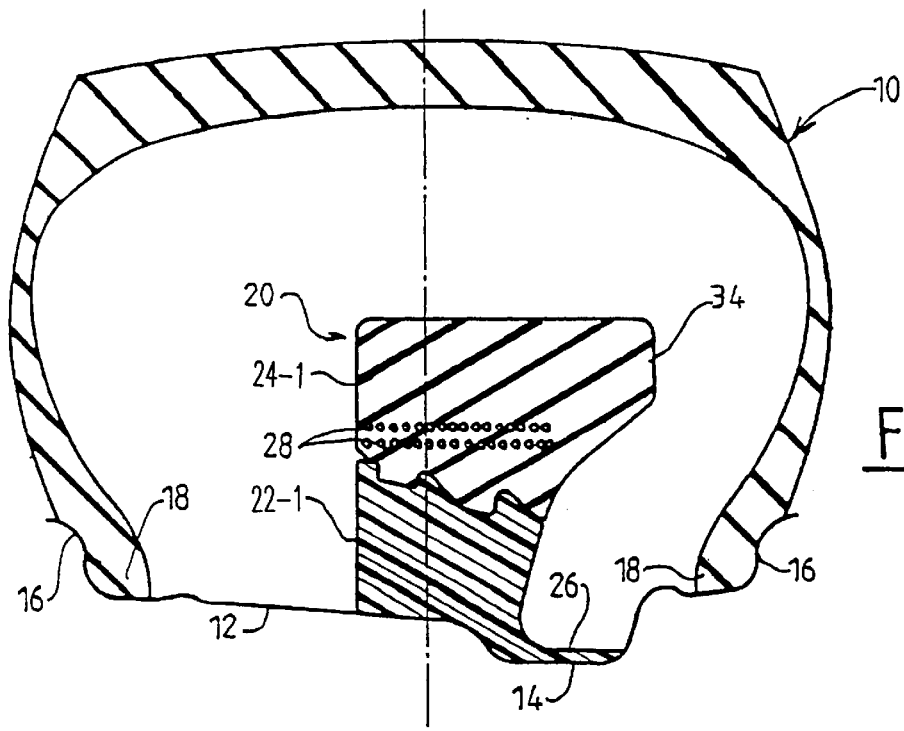
FIG. 1 is a diagrammatic half-view in axial section showing a device of the invention fitted on a rim inside a tire.

FIG. 1 shows a tire 10 of a type that is standard for a private vehicle, the tire being fitted on a rim 12 that is likewise of standard type, i.e. a single-piece rim having a rim well 14 and fixed lateral flanges 16 for holding the beads 18 of the tire, the lateral flanges 16 extending radially outwards from the surface of the rim 12 and of the rim well 14. That is why, in the prior art, run-flat rings which are fitted inside tires 10 on rims 12 have been made in the form of two or more curved portions in the form of circular arcs that are connected together end to end by link and tightening means using a screw or an eccentric arrangement. As mentioned above, such link means are sensitive to shock, and their lifetime can be short because of the fatigue phenomena to which they are subject.

The present invention provides a solution to this problem which is simple, low cost, and particularly reliable and effective.

In the embodiment of FIG. 1, a run-flat ring 20 comprises two coaxial annular pieces 22-1 and 24-1, with the radially-inner first piece 22-1 pressed against the outside surface of the rim 12 and having a lateral flange 26 extending inside the rim well 14, and with the radially-outer second piece 24-1 engaged on the first and surrounding it externally, the radially-inner first annular piece 22-1 forming a ring that is open at at least one point in its periphery, while the second piece forms a ring that is continuous.

The radially-inner first annular piece 22-1 is made of a relatively rigid material, such as a polyamide sold under the name NYRIM as already mentioned in the Applicants' earlier patents, for example, and it has an inside diameter which corresponds substantially to the diameter of the outside surface of the rim 12, while having an outside diameter which is substantially equal to or greater than the outside diameter of the lateral flanges 16 of the rim.

The radially-outer second annular piece 24-1 is made of an elastically deformable material such as a rubber or an elastomer and it has an inside diameter which is substantially equal to or greater than the outside diameter of the lateral flanges 16 of the rim and slightly smaller than the outside diameter of the first annular piece 22-1 such that when the second annular piece 24-1 is engaged on the radially-inner first piece 22-1, it encloses it and clamps it against the surface of the rim 12.

The radially-outer second piece 24-1 has at least one substantially inextensible annular element such as a band of metal or plastics material, a band of inextensible cloth, or indeed sheets of cords 28 as shown in FIG. 1, said sheets of cords being of the same type as those provided in power transmission belts and being embedded within the rubber or the elastomer of the radially-outer second piece 24-1, extending around the axis of the rim.

Under these circumstances, it is by compressing the rubber or the elastomer that is situated between the sheets of cords 28 and the inside surface of the radially-outer second annular piece 24-1 that the radially-inner first piece is clamped on the rim 12 and is held in place. In addition, the deformability of this portion of the radially-outer second piece makes it possible to give it an inside diameter that is very slightly smaller than the outside diameter of the lateral flanges 16 of the rim, if necessary.

The radially-inner first annular piece 22-1 and the radially-outer second annular piece 24-1 have respective outer and inner surfaces that are frustoconical in shape so as to facilitate centering and fitting the radially-outer second piece 24-1 on the radially-inner first piece 22-1, as described below.

In addition, annular grooves and ribs 30 and 32 of complementary shapes are formed in the outer surface of the radially-inner first piece 22-1 and on the inner surface of the radially-outer second piece 24-1 to hold the radially-outer second piece 24-1 on the radially-inner first piece and to lock the axial position thereof.

The outside dimensions of the radially-outer second piece 24-1 are determined as a function of the characteristics of the rim on which the run-flat device is to be fitted, as a function of the characteristics of the corresponding tire and motor vehicle, and as a function of the desired performance.

In the embodiment of FIG. 1, it can be seen that the radially-outer second piece 24-1 has a lateral flange 34 extending towards the outside wall of the tire 10 so as to oppose the tire 10 being separated from the rim when cornering while running on a flat, and to limit understeer for a flat front tire and oversteer for a flat back tire.

Figure 2:
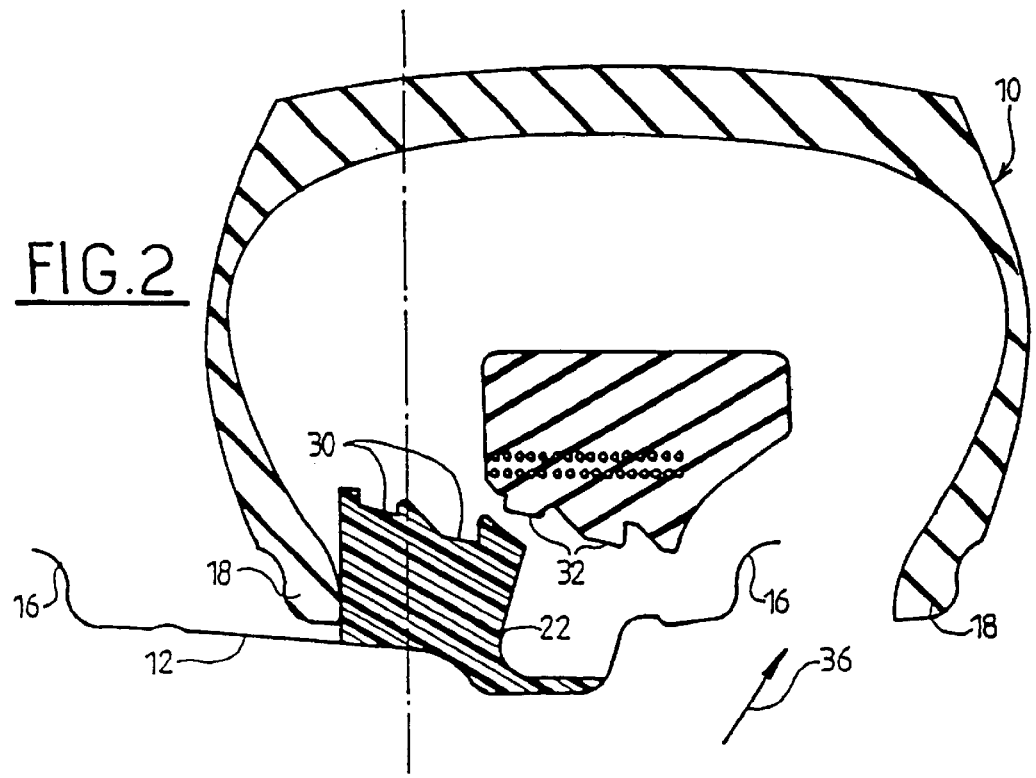
FIGS. 2 and 3 are views similar to FIG. 1 and show stages during the fitting of the device of the invention.
Figure 3:
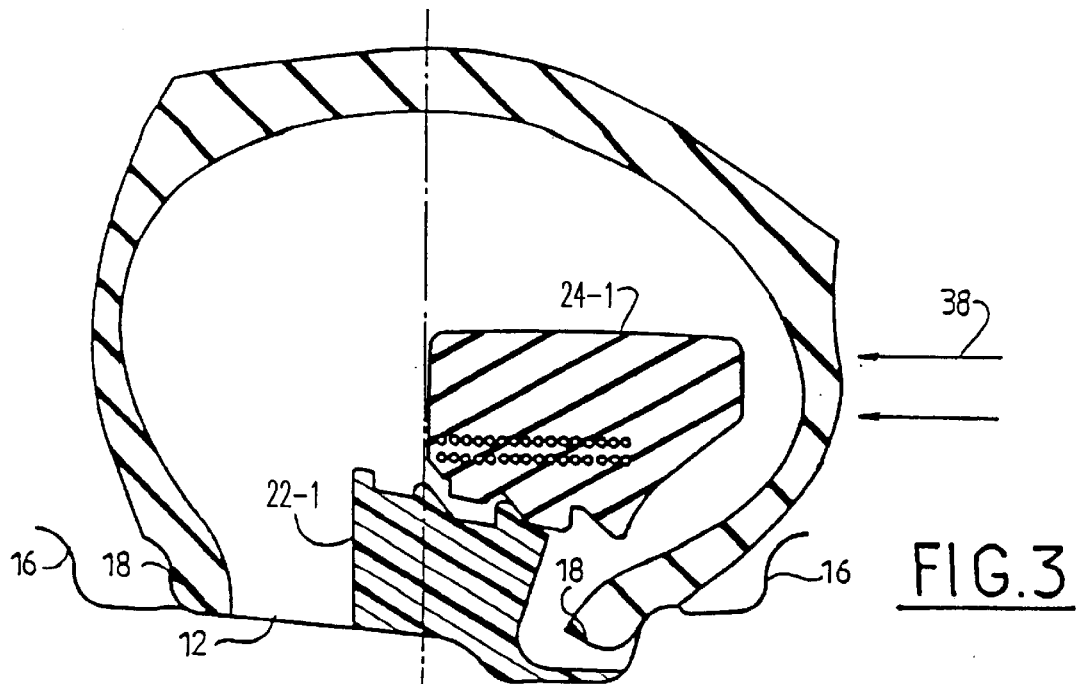

The main steps in fitting the device of the invention as shown in FIG. 1 on the rim 12 are shown diagrammatically in FIGS. 2 and 3.

Firstly a bead 18 of the tire is engaged on the rim 12 as shown in FIG. 2, and then the radially-inner first piece of the device is placed on the rim 12, which can be done quite easily because the radially-inner first piece 22-1 is open or split at at least one point of its periphery and can be deformed slightly by moving its two ends apart from each other so as to engage one of its ends on the rim 12 and then engage the remainder of the radially-inner first piece 22-1 progressively on the rim.

The bead 18 of the tire and the radially-inner first piece 22-1 are then on the rim in the position shown in FIG. 2, and it is possible to insert the radially-outer second piece 24-1 inside the tire in the direction indicated by the arrow 36 by slightly deforming the outside bead 18 of the tire, after which said radially-outer second piece 24-1 is brought over the rim, as shown in FIG. 2.

The outer and inner frustoconical surfaces of the radially-inner first piece 22-1 and of the radially-outer second piece 24-1 respectively enable the radially-outer second piece 24-1 to be centered and engaged partially on the first piece, as shown diagrammatically in FIG. 3, thereby leaving enough room to bring the outside bead 18 of the tire into the rim. Thereafter, by means of a garage press or any other equivalent means, pressure is exerted on the outside wall of the tire as indicated by arrows 38 to force the radially-outer second piece 24-1 into engagement on the radially-inner first piece, thereby clamping the radially-inner first piece 22-1 quite strongly against the rim 12 and putting the radially-inner portion of the radially-outer second piece 24-1 into compression, because of the increase in its inside diameter. Once the second piece has been properly engaged on the radially-inner first annular piece 22-1, as shown in FIG. 1, it is automatically held in place by the ribs 32 on its inner surface, which ribs are engaged in the grooves 30 of the outer surface of the radially inner first piece 22-1.

Naturally, the number, the shapes, and the dimensions of these grooves and ribs can be highly diverse.

The device can be stripped by means of the same press applying pressure on the radially-outer second piece 24-1 via the inside wall of the tire.

In the embodiment described above, the inclination, relative to the axis of the rim, of the outer frustoconical surface of the radially-inner first piece 22-1 and of the inner frustoconical surface of the radially-outer second piece 24-1 is determined so as to enable the radially-outer second piece 24-1 to be engaged on the first under the effect of thrust exerted on the outside wall of the tire, as already described.

Figure 4:
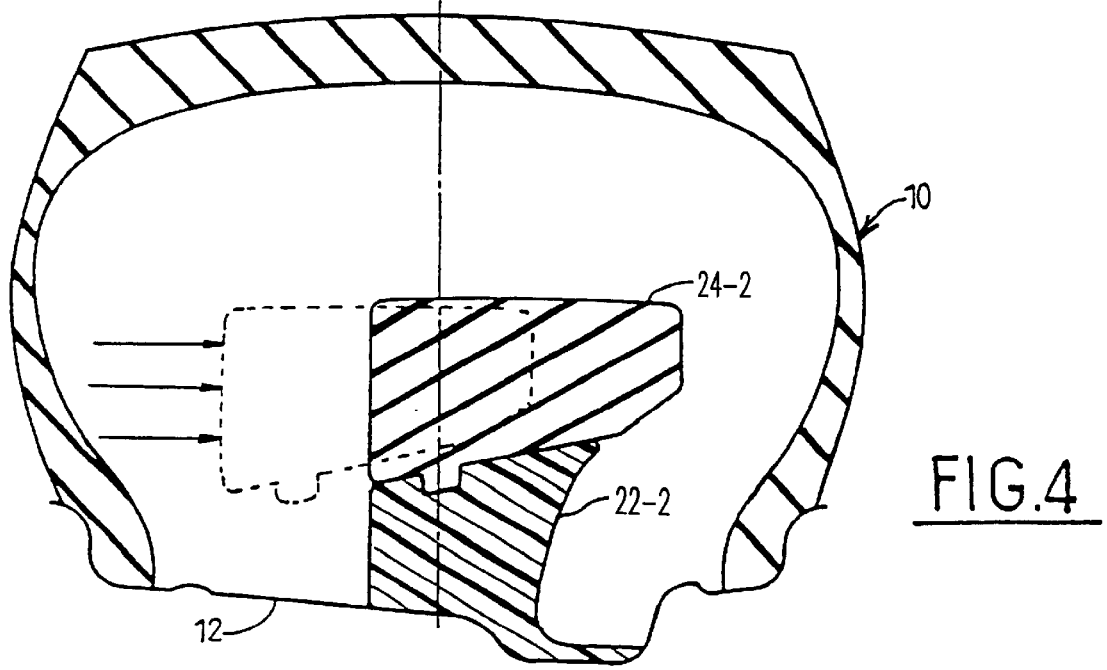
FIGS. 4 to 7 are diagrams showing variant embodiments.

It is also possible for these frustoconical surfaces to be inclined in the opposite direction, as in the embodiment shown diagrammatically in FIG. 4.

In this case, as will readily be understood, the device of the invention is fitted on the rim 12 by initially placing the radially-outer second piece 24-2 of the device around the rim 12 in the position shown by dashed lines, and then in putting the radially-inner first piece 22-2 into place on the rim 12 and in pushing the radially-outer second piece 24-2 via the inside wall of the tire in the direction indicated by the arrow so as to engage it on the radially-inner first piece 22-2.

Figure 5:
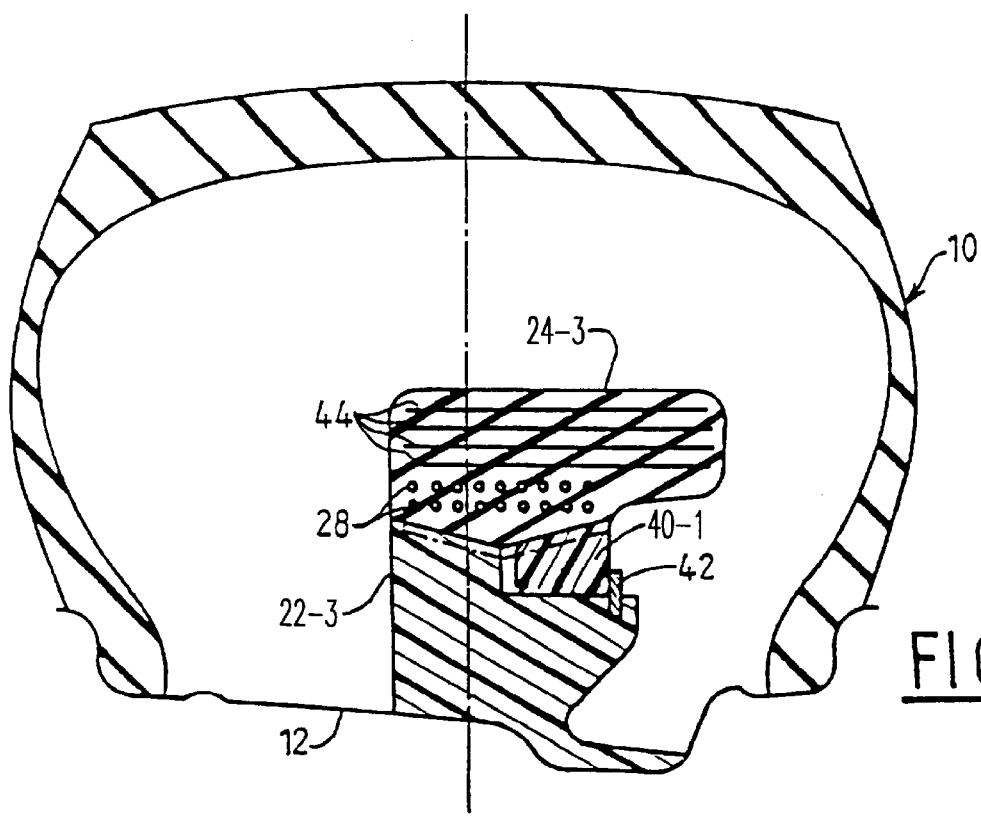

In the embodiment of FIG. 5, the means for holding or locking the radially-outer second piece 24-3 on the radially-inner first piece 22-3 no longer comprise complementary grooves and ribs on their frustoconical surfaces, but instead comprise a wedge-forming annular element 40-1 which is engaged by force between an outer surface of the radially inner first piece 22-3 and an inner frustoconical surface of the radially-outer second piece 24-3, the annular element 40-1 being held in axial position on the radially-inner first piece 22-3 by a removable abutment 42 such as a split washer engaged in a groove in the outer surface of the radially-inner first piece 22-3.

In this embodiment, the inner surface of the radially-outer second piece 24-3 is in the form of two cones, with its diameter increasing from the middle of said piece both towards the inside and towards the outside of the tire, a first conical portion of said inner surface cooperating with a complementary conical surface of the annular element 40-1, while the other conical portion of said inner surface co-operates with a complementary conical surface of the radially-inner first piece 22-3.

In the embodiments shown, the outer surface of the first piece 22-6, 22-7, the inner and outer surfaces of the intermediate piece 60-1, 60-2, and the inner surface of the radially-outer second annular piece 24-6, 24-7 are frustoconical and are formed with grooves and ribs of the above described type so as to ensure, after mutual engagement, that the intermediate annular piece 60-1, 60-2 is held in place on the radially-inner first annular piece 22-6, 22-7 and that the radially-outer second annular piece 24-6, 24-7 is held in place on the intermediate annular piece 60-1, 60-2.

Fitting can be done extremely simply and quickly:

The radially-inner first annular piece 22-6, 22-7 is put into place on the rim 12, which requires said piece to be slightly deformed as already mentioned, the intermediate annular piece 60-1, 60-2 is put into place on the radially-inner first annular piece 22-6, 22-7 which requires said intermediate piece to be deformed a little, and then the radially outer second annular piece 24-6, 24-7 is positioned on the intermediate piece 60-1, 60-2 and it is put into place by applying thrust from the outside wall of the tire by means of a press, as already described.

The radially-outer second annular piece 24-6, 24-7 serves to clamp the intermediate piece 60-1, 60-2 on the radially-inner first piece 22-6, 22-7, and also to clamp the radially-inner first piece 22-6, 22-7 on the rim 12.

Figure 9:
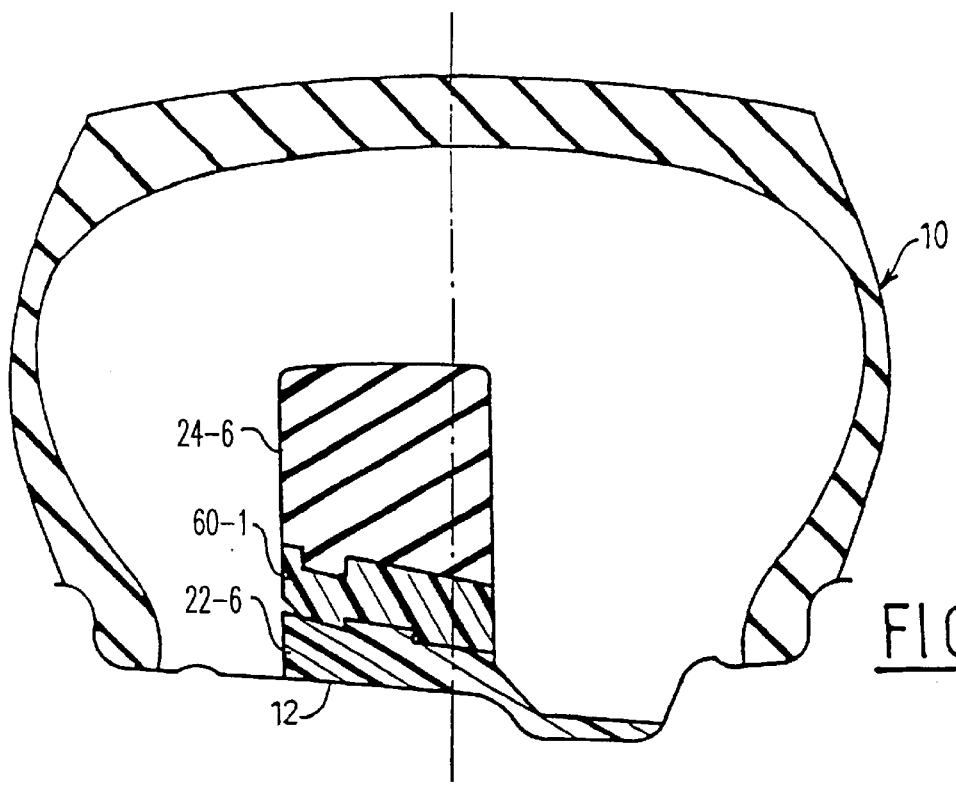
FIGS. 9 and 10 are diagrams showing other variant embodiments of the invention.
Figure 10:
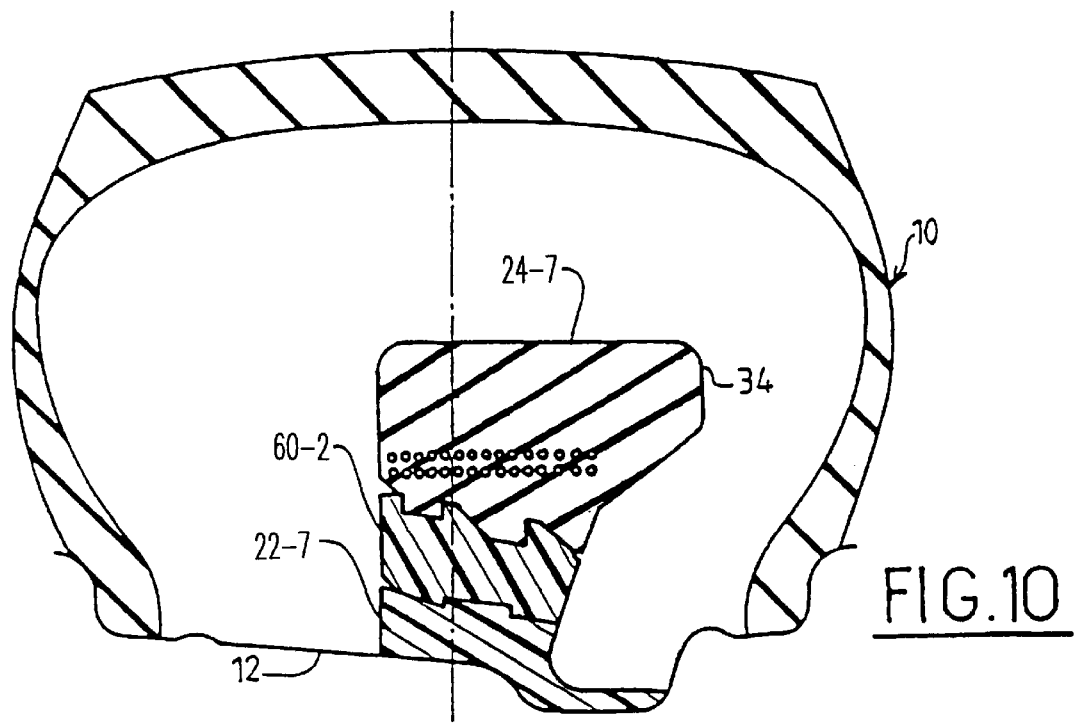

The embodiment shown in FIG. 10 differs from that of FIG. 9 in the number and shape of the circumferential grooves and ribs for holding the three annular pieces together, and by the radially-outer second annular piece 24-7 having a lateral flange 34 extending towards the outside wall of the tire 10, of the kind described above. holes 55 parallel to its axis for receiving bolts 54 which are screwed into nuts 56 fitted in corresponding orifices of the radially-inner first annular piece 22-5 or which are embedded in the material thereof. The inner surface of the radially-outer second piece 24-5 is in the form of two cones as described above and co-operates with a conical outer surface of the annular element 40-2 and a conical outer surface of opposite slope formed on the radially-inner first annular piece 22-5. Under these conditions, the bolts 54 when screwed into the nuts 56 serve to engage the radially-outer second annular piece 24-5 by force on the radially-inner first annular piece 22-5, and to hold it in place.

Figure 8:
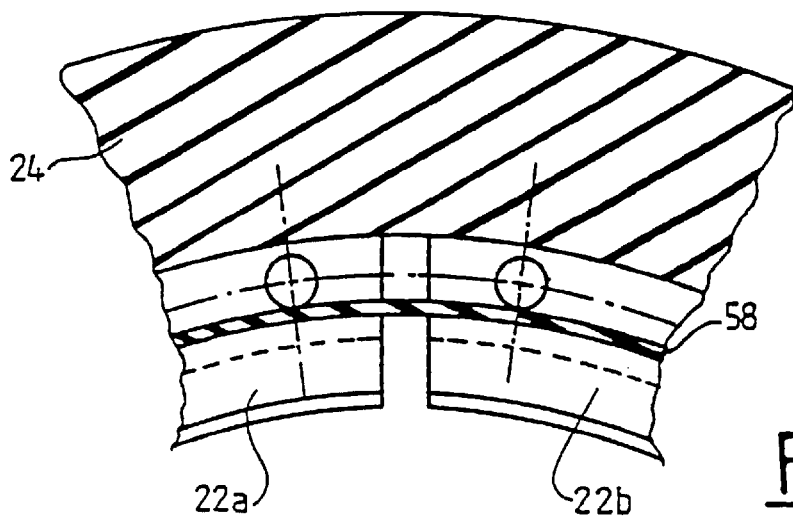
FIG. 8 is a diagrammatic fragmentary section on line VIII of FIG. 7.

The radially-inner first annular piece 22-5 can be made as two semicircular portions 22a and 22b as shown diagrammatically in FIG. 8, thereby facilitating fitting thereof on the rim 12, with it being easy to hold the two semicircular portions 22a and 22b on the rim 12 until the bolts 54 have been screwed into place by means of a rubber O-ring 58 fitted in a groove in the outer peripheral surface of these semicircular portions 22a and 22b.

When the annular element 40-2 is fixed on the semicircular portions 22a and 22b by the bolts 54, a radially-inner piece 22-5 clamped on the rim 12 is reconstituted.

In a variant, the annular element 40-2 or 48 can be locked on the outer peripheral surface of the radially inner first piece 22-5 by snap-fastening.

FIGS. 9 and 10 show two variant embodiments of the device of the invention, in which an intermediate piece 60-1, 60-2 in the form of an open ring of relatively rigid material, e.g. of the same material as the radially-inner first annular piece 22-6, 22-7, is interposed between said radially-inner first piece 22-6, 22-7 and the radially-outer second annular piece 24-6, 24-7, thus making it possible, for example, to halve the radial height of the radially-inner first annular piece 22-6, 22-7, thereby making it easier to put into place on the rim 12.

Thus, by pushing the annular element 40-1 via the outside wall of the tire, the radially-outer second annular piece 24-3 is engaged on the first piece and the radially-inner first annular piece 22-3 is clamped onto the rim 12.

In FIG. 5, it can also be seen that the radially outer second annular piece 24-3 comprises, in addition to the inextensible sheets of cords 28, parallel bands 44 of inextensible material which are radially outside the sheets of cords 28 so as to avoid any risk of the radially-outer piece 24-3 deforming in use.

The annular element 40-1 can form a ring that is continuous or that is open at at least one point of its periphery. If it is continuous, it must be fitted on a frustoconical surface of the radially-inner first piece 22-3 to clamp it onto the rim when it is pushed between the two pieces. When it is open, it can be fitted on the radially-inner first piece on a surface thereof that is cylindrical, as shown in FIG. 5.

Figure 6:
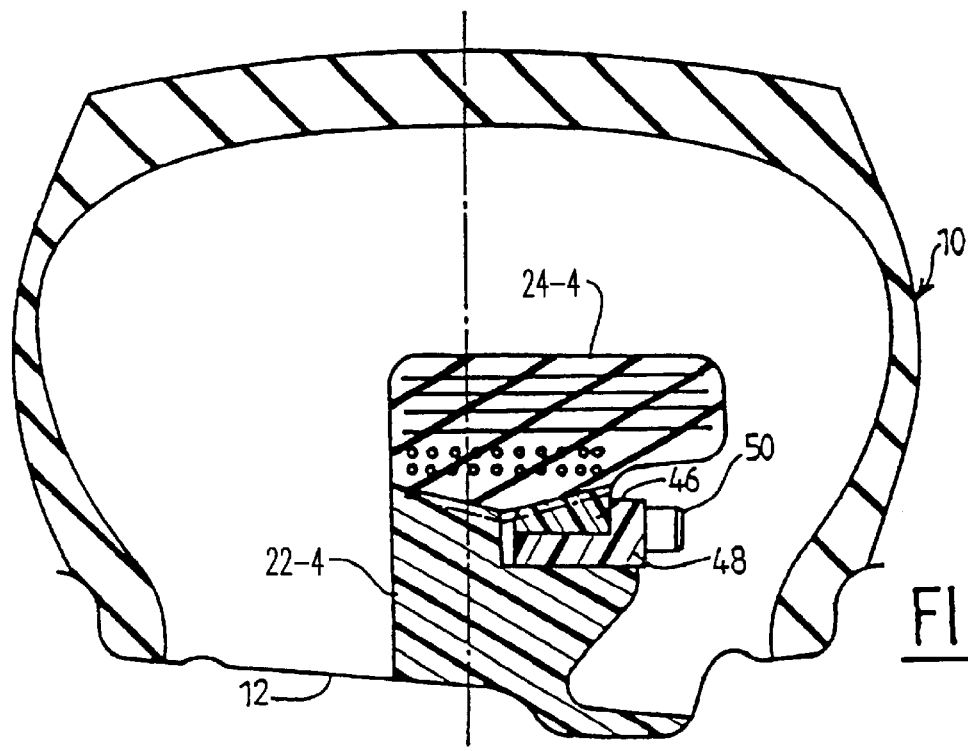

In the embodiment of FIG. 6, the radially-outer second piece 24-4 is engaged on the first piece and is locked in position by means of a wedge-forming open annular element 46 carried by a radially split annular collar 48 having a threaded inner cylindrical surface enabling it to be screwed on a corresponding threaded outer cylindrical surface of the radially-inner first annular piece 22-4. Studs 50 are provided on the collar 48 to make it easier to rotate around its axis and to screw it onto the radially-inner first piece 22-4.

The radially-outer second piece 24-4 is thus engaged and held or locked on the radially-inner first piece 22-4 by screwing the collar 48 onto the radially-inner first annular piece 22-4.

Figure 7:
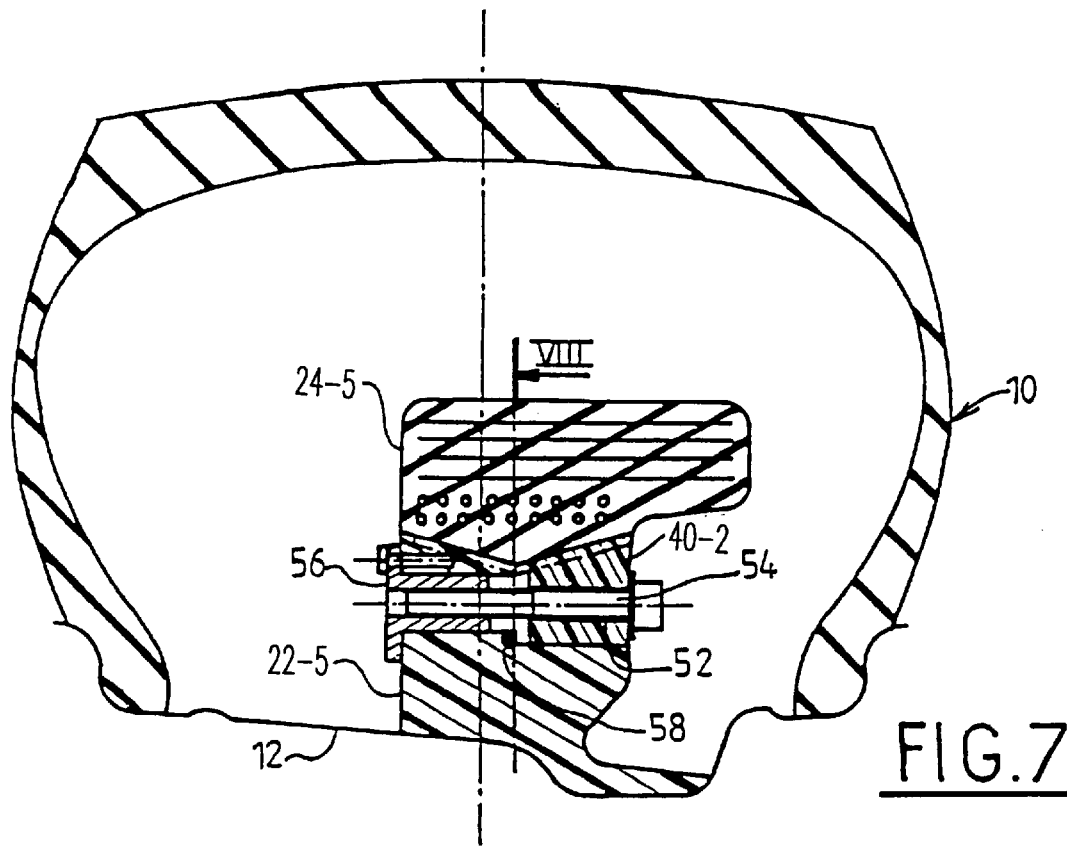

In the embodiment shown diagrammatically in FIGS. 7 and 8, the radially-outer second annular piece 24-5 is engaged and held on the radially-inner first annular piece 22-5 by means of an annular element 40-2 similar to that shown in FIG. 5, but which includes In all of the embodiments described, the radially inner first annular piece and the intermediate annular piece can be made in the form of two or more circularly-arcuate curved portions so as to make them easier to fit around the rim, with these portions easily being held in place end to end by means of an O-ring or the like received in a groove in the outer peripheral surface thereof, as described above for the embodiment of FIGS. 7 and 8.

The radially-inner first annular piece and the intermediate piece can thus be made in the form of a plurality of portions that are connected together end to end by snap-fastening elements so as to be held on the rim until the radially-outer second piece is fitted. Each of them can also be in the form of a continuous ring that is open at a point of its periphery, but that includes a plurality of deformable zones (two, three, or more) making it possible to put the ring into place around the rim. This serves in particular to make lighter ribbed pieces out of a plastics material having a high modulus of elasticity. Under such circumstances, the rubber radially-outer second annular piece can have a large inside diameter and a radial thickness that is relatively small.

Naturally, it is also possible to combine the embodiments of FIGS. 9 and 10 with those of the preceding figures, e.g. by replacing the radially-inner first annular piece of the embodiments of FIGS. 5 and 6 by a radially-inner first annular piece and an intermediate annular piece as shown in the embodiments 5 of FIGS. 9 and 10.

It can also be advantageous to place a layer of rubber or the like between the rim and the inner surface of the first piece so as to accommodate or compensate for manufacturing tolerances, so as to compensate for any surface irregularities on the rim (e.g. traces of welding on the wheel disc), and so as to increase the coefficient of friction between the rim and the run-flat device.

FIGS. 11 to 25 show an improved variant of the run-flat device of the invention, which variant is easier to implement.

Reference is made to FIGS. 11 to 15 which are diagrams showing a preferred embodiment of the run-flat device of the invention, for fitting on a standard type of motor vehicle wheel whose rim 12 is constituted by a single piece that cannot be disassembled and that has lateral flanges 16 for pressing against and holding the beads 18 of a tire 10 of the tubeless type.

In conventional manner, the wheel rim 12 is formed with an annular drop center or "well" 14 and with two circumferential ribs 120 for holding the beads 18 of the tire, the rib 120 on the outside of the wheel (right-hand side in FIGS. 11 to 15) projecting further into the inside of the tire than does the other rib 120 situated on the inside of the wheel, since the outside wall of the tire is subjected to higher forces during cornering than is the inside wall of the tire.

The improved variant of the run-flat device of the invention comprises a radially-inner piece 22-8 made of relatively rigid material, such as a plastics material, an intermediate annular piece 124-1 made of relatively rigid material such as a plastics material, and a substantially inextensible radially-outer second annular piece 24-8, the two first annular pieces 22-8 and 124-1 being open at at least one point in their respective peripheries, while the radially-outer annular piece 24-8 is continuous.

The radially-inner annular piece 22-8 is placed on the rim 12, in part in the rim well 14, and is of a shape that is complementary to the shape of the rim 12 so as to be prevented from moving in translation in a direction parallel to the axis of the wheel and so as to be in abutment in the inside-outside direction relative to the wheel. The intermediate annular piece 124-1 is fitted on the radially-inner annular piece 22-8, with the facing annular surfaces of the pieces 22-8 and 124-1 having complementary frustoconical shapes, with at least one of them having at least one annular groove 30 and with the other one having at least one annular rib 32 of complementary shape, thereby enabling the intermediate annular piece 124-1 to be fitted on the radially-inner piece by engagement and snap-fastening, the rib 32 of the intermediate piece 124-1 being received in the groove 30 of the radially-inner piece 22-8 and serving to position the intermediate piece 124-1 on the radially-inner piece 22-8 in an axial direction and to hold it axially in position.

Figure 11:
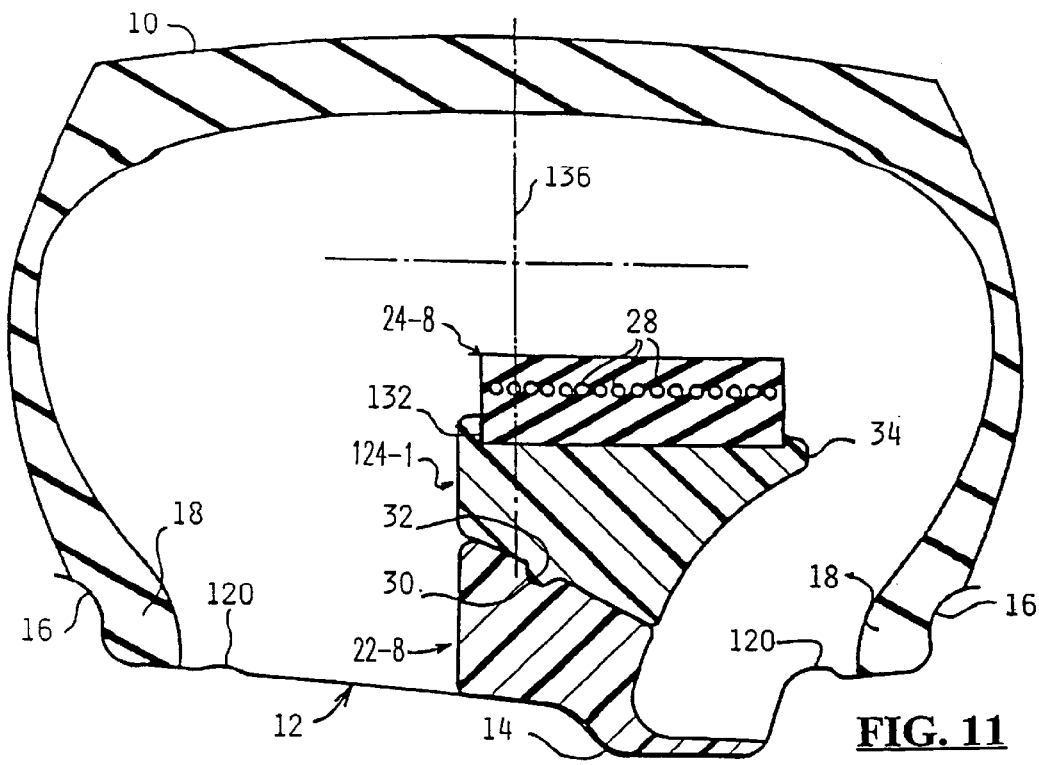
FIG. 11 is a diagrammatic fragmentary axial section of a motor vehicle wheel fitted with a preferred improved variant of a run-flat device of the invention.

As can be seen in FIG. 11, the complementary frustoconical surfaces of the pieces 22-8 and 124-1 flare going from the outside towards the inside of the wheel, and each of the above-mentioned grooves and ribs 30, 32 has one straight lateral face that is substantially perpendicular to the axis of the wheel on the inside of the wheel, and another lateral face that slopes or curves towards the outside of the wheel, such that the intermediate annular piece 124-1 is held in place by coming into abutment against the radially-inner piece 22-8 when subjected to axial forces going from the outside towards the inside of the wheel.

The outer peripheral surface of the intermediate piece 124-1 is formed with a U-shaped groove or channel 132 in which the radially-outer annular piece 24-8 is received, said groove or channel 132 having a lateral face on the inside of the wheel which is taller than its lateral face on the outside of the wheel, thereby facilitating fitting and stripping of the radially-outer annular piece relative to the intermediate annular piece 124-1, as explained below, and also serving to improve the axial holding of the radially-outer piece 24-8 on the intermediate piece 124-1 in the event of forces being applied to the run-flat device from the outside towards the inside of the tire. The bottom of the channel 132 is substantially parallel to the axis of the piece 124-1.

The radially-outer annular piece 24-8 is substantially rectangular in section and has at least one sheet of 15 substantially inextensible cords 28, e.g. made of polyester, glass fibers, Kevlar® fibers, metal, etc. forming adjacent or substantially touching turns inside a mass of rubber or any other appropriate material having a relatively low modulus of elasticity, an annular piece 24-8 of the kind shown in FIG. 1 being suitable for being made with quite good dimensional accuracy by using conventional techniques for manufacturing power transmission belts.

As can be seen in FIG. 11, the run-flat device is offset from the equatorial midplane 136 of the wheel and is closer to the outside wall of the tire 10, the intermediate annular piece 124-1 also having a lateral flange 34 extending towards the outside wall of the tire and constituting an abutment for said wall in the event of running on a flat or partially deflated tire, so as to avoid the tire becoming separated from the rim.

The annular pieces 22-8 and 124-1 are advantageously made of a plastics material of the polyamide type such as "NYRIM". The pieces 22-8 and 124-1 can be solid, or ribbed 35 to reduce their weight. The radial thickness of the piece 24-8 is about 20 mm, for example.

The method of fitting this device is described below with reference to FIGS. 12 to 14.

Figure 12:
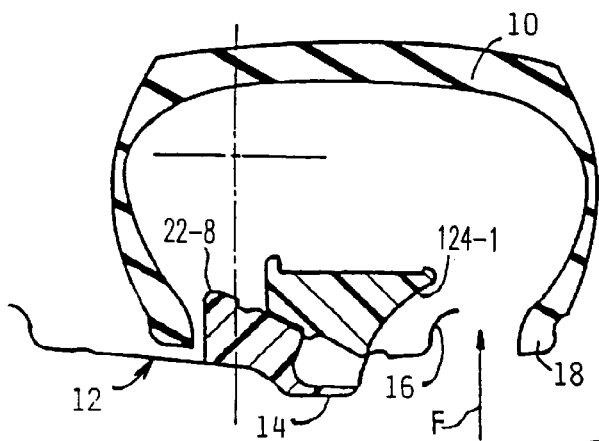
Figure 13:
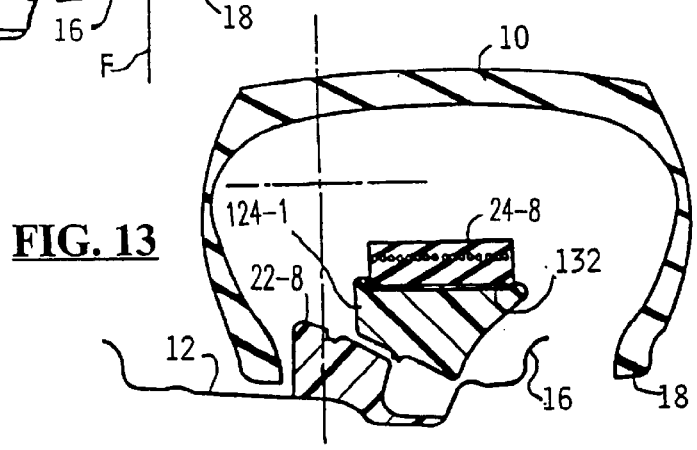

As shown in FIG. 12, the first step is to move the outside bead 18 of the tire away from the corresponding lateral flange 16 of the rim so as to leave an annular gap between them enabling the annular pieces 22-8 and 124-1 to be inserted inside the tire around the rim 12, as indicated very diagrammatically by arrow F.

The open radially-inner annular piece 22-8 is put into place first on the rim 12, said piece 22-8 automatically taking up its position inside the well of the rim 14, as mentioned above, with a small amount of deformation of the radially-inner annular piece 22-8 obtained by separating its ends from each other in an axial direction enabling it to be inserted quite easily around the rim 12 by proceeding progressively, with this being true even though the inside diameter of the radially-inner annular piece 22-8 is considerably smaller than the outside diameter of the flange 16 of the rim.

The same procedure is used with the intermediate annular piece 124-1 which is engaged partially on the radially-inner annular piece 22-8 so that the intermediate piece 124-1 rests on the radially-inner annular piece 22-8 and on the outer annular rib 120 of the rim, as shown.

Thereafter (FIG. 13), the radially-outer annular piece 24-8 is inserted inside the tire and placed around the intermediate annular piece 124-1 which is relatively easy because the inside diameter of the radially-outer annular piece 24-8 is clearly greater than the outside diameter of the flange 16 of the rim 12. To put the radially-outer piece 24-8 into place on the intermediate place 124-1, the outside diameter thereof is reduced by moving its two ends towards each other, as shown diagrammatically in FIG. 13, such that the inside diameter of the radially-outer piece 24-8 is then substantially equal to or slightly greater than the outside diameter of the intermediate piece 124-1, on the outside side of the tire.

Cavities can be provided in the outer side face of the intermediate piece 124-1 in the vicinity of its ends so as to enable them to be moved towards each other by means of pliers or the like, and also so as to enable them to be held close together by means of a U-shaped shackle or the like with the limbs of the U-shape being engaged in the above-mentioned cavities.

Once the radially-outer annular piece 24-8 has been fitted on the intermediate piece 124-1 by being placed in the channel 132, the ends of the intermediate piece 124-1 are released so that it expands a little inside the radially-outer piece 24-8, and the outside bead 18 of the tire is put inside the rim as shown diagrammatically in FIG. 14, after which axial thrust is applied to the outside wall of the tire from the outside towards the inside, as indicated by arrows 38, level with the intermediate piece 124-1 so as to engage it by force onto the first piece until snap-fastening takes place, with said snap-fastening being obtained when the rib 32 of the intermediate piece 124-1 engages in the groove 30 of the radially-inner piece 22-8, producing a characteristic noise that can be heard clearly.

The run-flat device is then assembled, being in the position shown in FIG. 11.

Thereafter, the beads of the tire need to be put back into place against the flanges of the rim by inflating the tire.

To strip the run-flat device, the procedure is as shown diagrammatically in FIG. 15, i.e. once the tire has been deflated, its outside bead 18 is extracted from the rim flange and axial thrust is applied to the intermediate annular piece 124-1 in the inside-to-outside direction as indicated diagrammatically by arrows 142. This enables the assembly constituted by the intermediate piece 124-1 and the radially-outer piece 24-8 to be disengaged from the radially-inner piece 22-8, after which the intermediate piece 124-1 is again tightened by moving its ends towards each other so as to enable the radially-outer piece 24-8 to be extracted from the channel 132 of the intermediate piece 124-1, and the radially-outer piece 24-8 is extracted from the tire by passing it through the annular gap left between the outside bead 18 of the tire and the flange of the rim.

Thereafter the intermediate piece 124-1 is extracted from the rim and from the tire by proceeding in the opposite manner to that used for fitting it inside the tire, after which the radially-inner annular piece 22-8 is extracted likewise from the rim and the tire.

To exert the axial thrust shown diagrammatically by arrows 38 and 142 on the walls of the tire, it is possible to use a tire-fitting and stripping machine of the kind to be found in any car repair garage and which comprises a turntable on which the wheel is placed and a member for extracting the beads, which member can be used to apply pressure locally to the wall of the tire.

It is also possible to use a simple tire-removing lever, as shown diagrammatically in FIGS. 16 and 17 when fitting the run-flat device on a wheel rim.

For this purpose (FIG. 16), the wheel is laid down flat with its outside on top, the radially-inner annular piece 22-8 being in place around the rim, the intermediate annular piece 124-1 being partially engaged on the radially-inner piece, and the radially-outer annular piece 24-8 being in place on the intermediate piece 124-1. The outer bead 18 of the tire is pushed back into the well of the rim 14 and, at a point on the periphery of the wheel, a tire lever 144 is inserted into the well of the rim so that the end of the lever is inside the well and an intermediate portion of the lever is pressed against the outside wall of the tire, level with the lateral flange 34 of the intermediate piece 124-1.

By pushing the lever downwards as indicated diagrammatically in FIG. 16, the intermediate piece 124-1 is pressed against the radially-inner piece 22-8 until snap-fastening at one point of their periphery.

The same operation is then repeated at various points around the periphery of the tire, as indicated by way of example in FIG. 17, until the intermediate annular piece 24-8 is fully engaged and snap-fastened on the radially-inner piece 22-8, with said full snap-fastening producing a characteristic noise that is audible.

Thereafter, all that remains is to put the beads 18 of the tire into place relative to the lateral flanges of the rim and to inflate the tire.

The apex angle of the complementary frustoconical surfaces of the radially-inner piece 22-8 and of the intermediate piece 124-1 is relatively small, e.g. about 30° to 50%, such that the force required to engage the intermediate piece 124-1 on the radially-inner piece 22-8 is not very large. Likewise, the force that needs to be applied to the intermediate piece 124-1 to disengage it from the radially-inner piece 22-8 is not very large, because of the cooperating rounded shapes of the outer lateral faces of the above-mentioned groove 30 and rib 32, but is quite sufficient to ensure that the various pieces remain held in place in use.

The inside diameter of the radially-outer annular piece 24-8 is determined so as to hold the pieces 22-8 and 124-1 clamped against each other and against the rim 12 respectively, so as to be capable of withstanding running forces when said radially-outer piece 24-8 is in place on the intermediate piece 124-1.

The radially-inner annular piece 22-8 can be prevented from rotating relative to the rim 12 by the valve 146 for inflating the tire (FIGS. 18 and 19) providing said valve is made of metal, with the radially-inner piece 22-8 being placed on the rim in such a manner that the inflation valve 146 extends between the ends 148 thereof.

The gap formed between the ends 150 of the intermediate annular piece 124-1 is diametrically opposite the inflation valve 146. The intermediate annular piece 124-1 has a local rib 152 projecting from its inner surface, said rib being diametrically opposite the ends 150 of the intermediate piece 124-1 so as to be engaged in the ends 148 of the radially-inner piece 22-8 and thus prevent the intermediate piece 124-1 from rotating on the radially-inner piece 22-8.

When in the free state, the ends 150 of the intermediate piece 124-1 are spaced apart from each other by a distance which is not less than the difference between the outer peripheral dimension of the intermediate piece 124-1 and the inner peripheral dimension of the radially-outer piece 24-8 so that when said ends 150 are moved towards each other, the outer peripheral dimension of the intermediate piece 124-1 becomes equal to or slightly less than the inner peripheral dimension of the radially-outer piece 24-8.

Figures 18, 19:
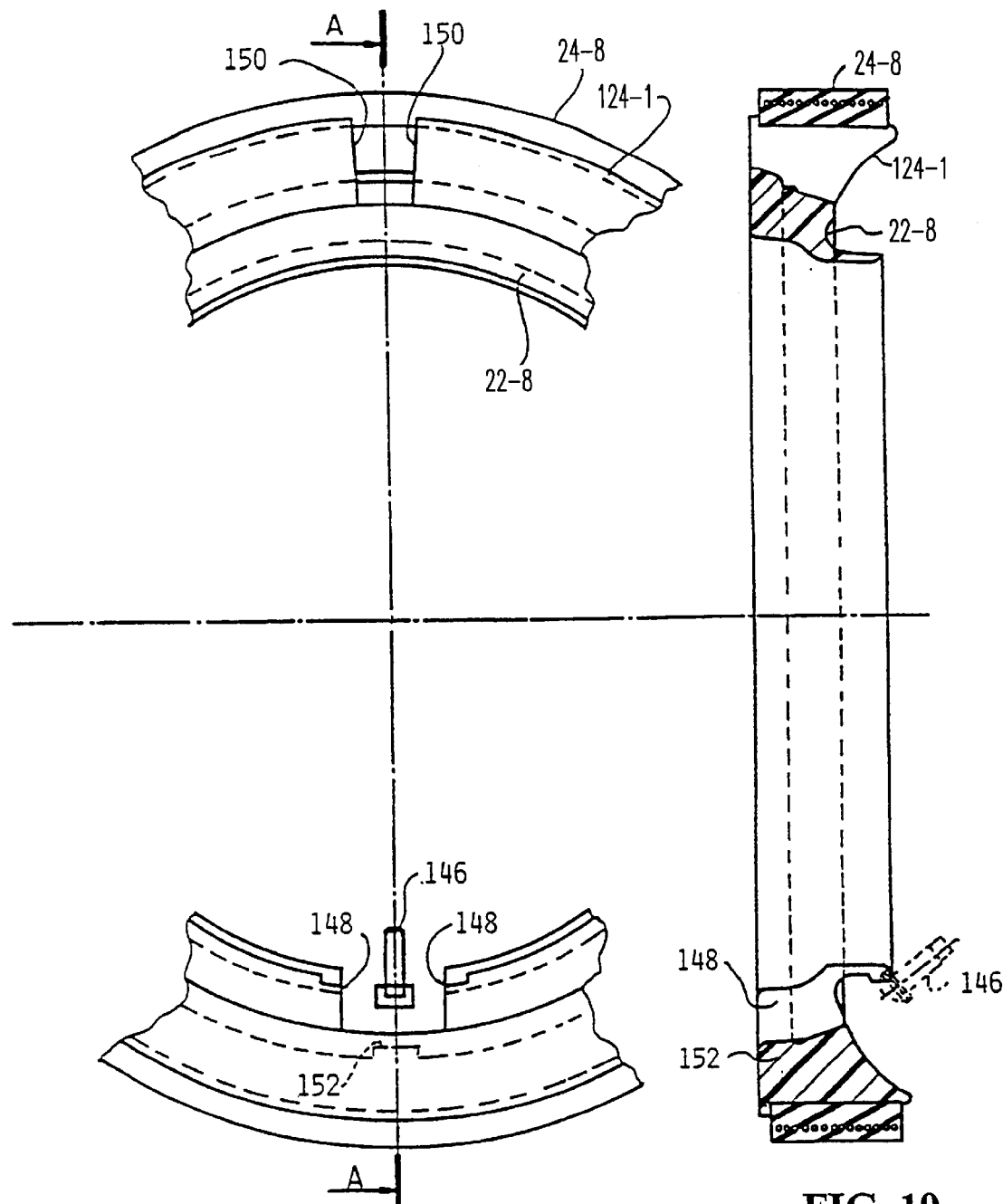
FIG. 18 is a fragmentary diagrammatic face view of a run-flat device of the invention.
FIG. 19 is a diagrammatic axial section view on line A—A FIG. 18.

The distance between the ends 48 of the radially-inner annular piece 22-8 is determined so as to enable the run-flat device to have good rotary balance when the openings of the annular pieces 22-8 and 124-1 are diametrically opposite from each other as shown diagrammatically in FIGS. 18 and 19.

Figure 20:
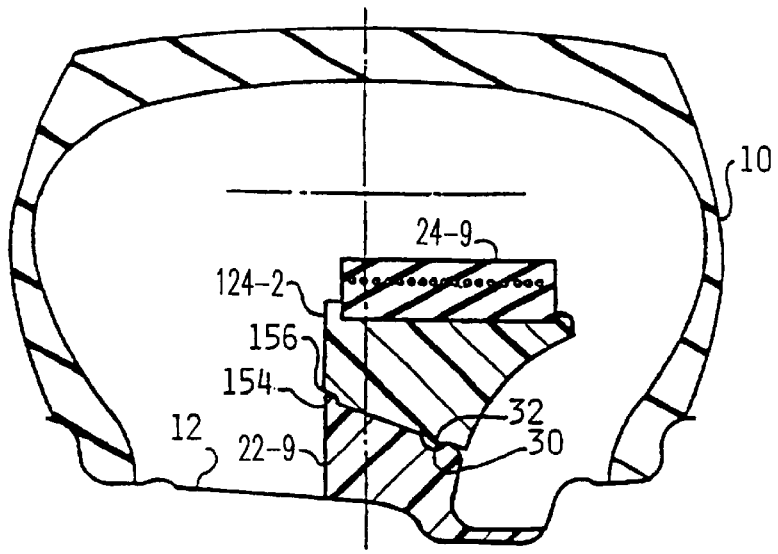
FIGS. 20 to 24 are views corresponding to FIG. 10 and showing variant embodiments of the invention.

In the variant embodiment shown in FIG. 20, the run-flat device differs from that to the preceding figures by the configuration of the complementary frustoconical surfaces of the radially-inner piece 22-9 and of the intermediate piece 124-2.

The frustoconical peripheral surface of the radially-inner piece 22-9 is formed with a groove 30 of rounded section adjacent to the outside wall thereof and with a flange 154 projecting radially outwards from its inside wall, the inner peripheral surface of the intermediate piece 124-2 being of complementary shape and thus having a rib 32 of curved section in the vicinity of its outside wall, and a setback 156 in its inside wall.

This configuration makes it possible to reduce the force required to engage the intermediate piece 124-2 on the radially-inner piece 22-9.

Figure 21:
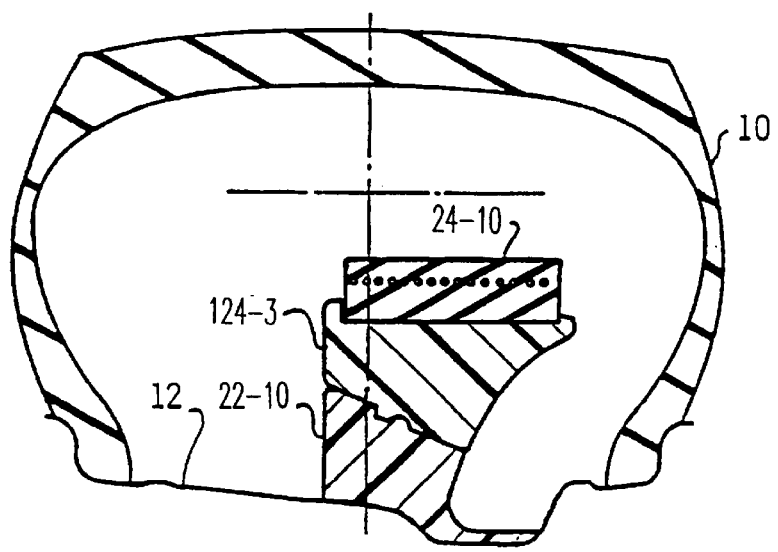

In the variant embodiment of FIG. 21, the frustoconical surfaces of the pieces 22-10 and 124-3 are both formed to have a groove and a rib, the groove formed in the outer peripheral surface of the radially-inner piece 22-10 receiving the rib formed in the inner peripheral surface of the intermediate piece 124-3, while the rib formed on the outer peripheral surface of the radially-inner piece 22-10 is engaged in the groove formed in the inner peripheral surface of the intermediate piece 124-3.

Figure 22:
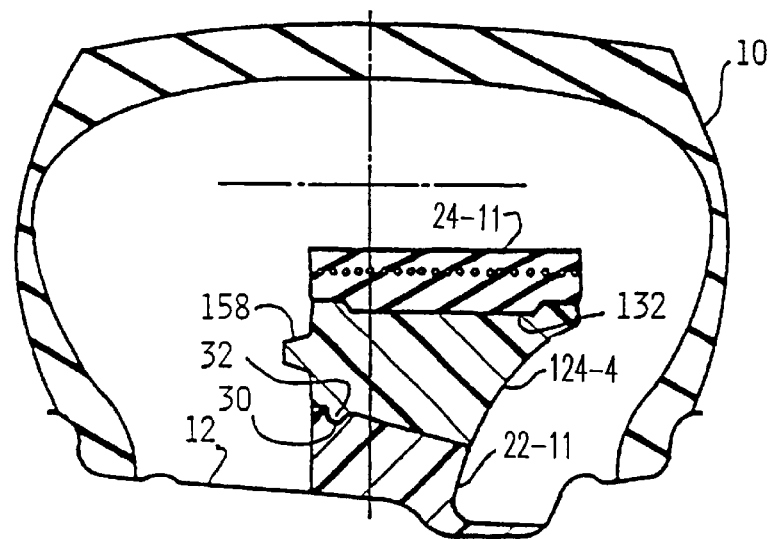

In the variant embodiment shown in FIG. 22, the groove 30 formed in the outer peripheral surface of the radially-inner piece 22-11 and the rib 32 formed in the inner peripheral surface of the intermediate piece 124-4 are closer to the inside walls of said pieces than in the embodiment of FIGS. 11 to 15, and the inside wall of the intermediate piece 124-4 is formed to have an annular projection 158 which constitutes a bearing surface against which thrust can be applied as represented diagrammatically by arrows 142 in FIG. 15, for the purpose of stripping the run-flat device of the invention.

In addition, in this FIG. 22 variant embodiment, the channel 132 formed in the outer peripheral surface of the intermediate piece 124-4 has lateral walls which diverge away from each other going radially outwards, the inner peripheral surface of the radially-outer piece 24-11 being of complementary shape, thereby making it easier to accommodate manufacturing tolerances when fitting the radially-outer annular piece 24-11 on the intermediate piece 124-4.

Figure 23:
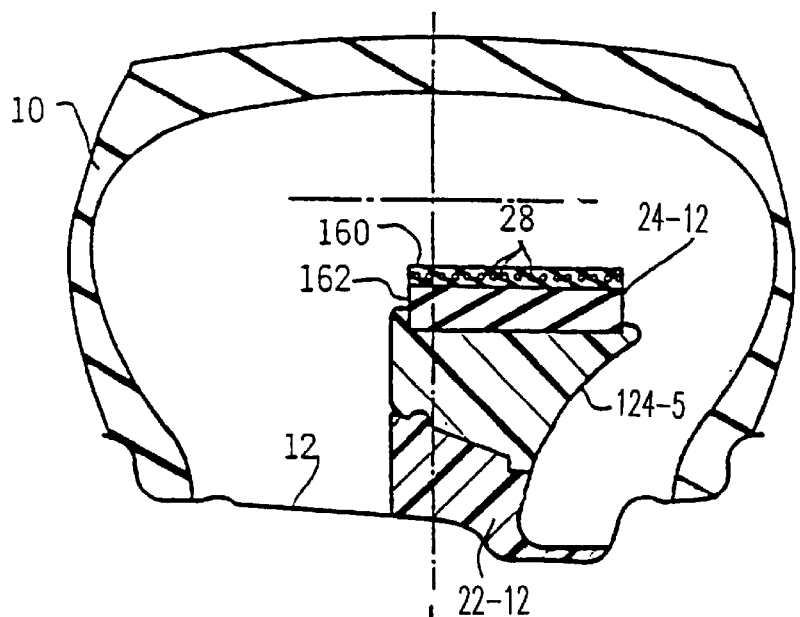

In the variant embodiment of FIG. 23, the outer peripheral surface of the radially-inner piece 22-12 is formed in the vicinity of its inside wall with a rib of rounded section which engages in a groove of complementary shape in the inner peripheral surface of the intermediate piece 124-5, and its outside wall has an annular setback in which there is received a peripheral flange extending radially inwards from the inside wall of the intermediate piece 124-5.

In addition, the radially-outer annular piece 24-12 is made up of two layers of material of different hardnesses, an outer layer 160 of greater hardness containing the inextensible cords 38, and an inner layer 162 of smaller hardness which is engaged in the channel in the outer peripheral surface of the intermediate piece 124-5, with the smaller hardness thereof making it possible to achieve better compensation for manufacturing tolerances.

Figure 24:
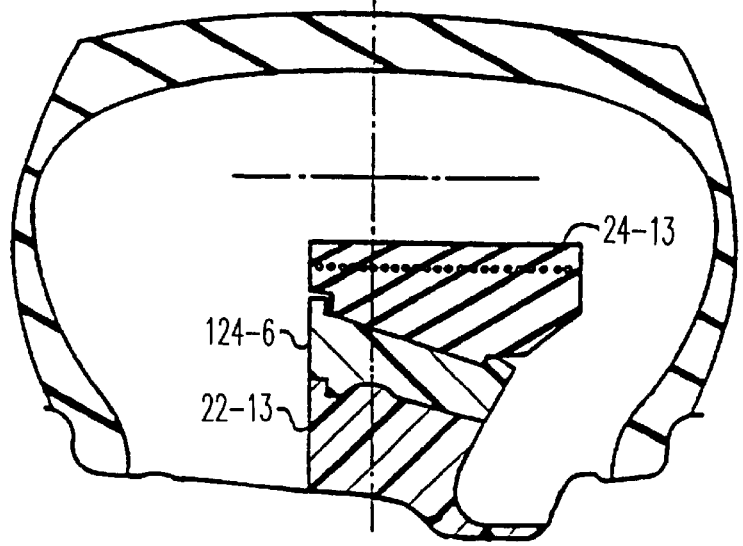

In the variant embodiment shown in FIG. 24, the run-flat device differs from the preceding embodiments essentially in that the radially-outer piece 24-13 is no longer rectangular in section, but has an inner peripheral surface that is frustoconical in shape which is received in a channel of the outer peripheral surface of the intermediate piece 124-6, the bottom of said channel also forming a frustoconical surface about the axis of the intermediate piece 124-6, with the above-specified frustoconical surfaces flaring going from the inside towards the outside of the wheel.

This configuration facilitates fitting of the radially-outer piece 24-13 on the intermediate piece 124-6, but it increases the volume and the mass of the radially outer annular piece 24-13.

Figure 25:
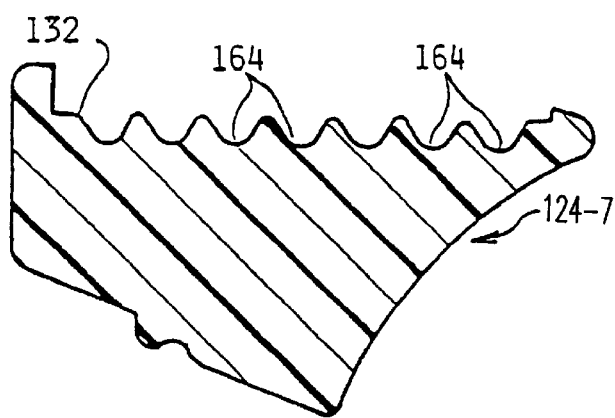
FIG. 25 is a fragmentary axial section view of a variant embodiment of the intermediate annular piece of the device of the invention.

In the variant embodiment of FIG. 25, which shows the section of the intermediate annular piece 124-7, the bottom of the channel 132 which receives the inner peripheral portion of the radially-outer annular piece is not plane, but is corrugated, being formed with a series of circumferential grooves 164. This makes it possible to reduce the force required to fit the assembly constituted by the intermediate and radially-outer annular pieces on the radially-inner annular piece, with the reduction in the area of contact between the intermediate piece 124-7 and the radially-outer piece making it possible to reduce the compression of the matter constituting the radially-outer annular piece.

In general, the locking and unlocking of the intermediate annular piece on the first annular piece can be achieved using any tool or machine suitable for applying localized or circumferential pressure to the wall of a tire.

What is claimed is:

1. A run-flat device for a motor vehicle, the vehicle including a rim having lateral flanges for holding beads of a tire, said device comprising:
   a radially-inner annular piece being of relatively rigid material and adapted to form a non-continuous ring around the rim;
   an intermediate annular piece that is non-continuous, made of relatively rigid material, and fitted on said radially-inner annular piece; and
   a substantially inextensible radially-outer annular piece that is continuous and that is fitted on said intermediate annular piece, said radially-outer annular piece having an inside diameter that is substantially equal to or greater than an outside diameter of a lateral flange of the rim.

2. A device according to claim 1, wherein said inside diameter of said radially-outer piece that is slightly smaller than an outside diameter of said radially-inner annular piece and is engaged by force thereon.

3. A device according to claim 1, wherein said radially-outer piece includes a substantially inextensible annular means embedded in a material constituting said radially-outer piece.

4. A device according to claim 1, wherein said at least two coaxial annular pieces have contact surfaces that are frustoconical, at least in part.

5. A device according to claim 1, further comprising axial holding means for holding said radially-outer piece axially on said radially-inner piece.

6. A device according to claim 5, wherein said axial holding means comprise an annular element forming a wedge between said radially-inner piece and said radially-outer piece and held in position between said two pieces by fixing means.

7. A device according to claim 6, wherein said fixing means comprise bolts adapted to be parallel to an axis of the rim and engaged in corresponding holes in said annular element and said radially-inner piece.

8. A device according to claim 7, wherein said bolts are screwed into nuts received in said holes of said radially-inner piece.

9. A device according to claim 6, wherein said annular element has a threaded cylindrical inner surface and is screwed on a corresponding threaded cylindrical bearing surface of said radially-inner piece.

10. A device according to claim 6, wherein said annular element is held in position on said radially-inner piece by a split washer received in a groove in a peripheral surface of said radially-inner piece.

11. A device according to claim 5, wherein said axial holding means comprise circumferential grooves and ribs formed in contact surfaces between said radially-inner piece and said radially-outer piece.

12. A device according to claim 1, wherein said intermediate annular piece is engaged coaxially between said radially-inner piece and said radially-outer piece.

13. A device according to claim 12, further comprising axial holding means for holding said radially-inner piece relative to intermediate annular piece, said axial holding means comprising circumferential grooves and ribs formed in contact surfaces between said radially-inner piece and said intermediate annular piece.

14. A device according to claim 12, wherein said radially-inner piece and said intermediate piece are made of rigid plastics material, and said radially-outer piece is made of rubber or elastomer.

15. A device according to claim 12, wherein:
   said radially-inner piece is non-continuous and said intermediate annular piece is non-continuous, said radially-inner piece and said intermediate annular piece being made of relatively rigid material and being fitted one on the other;
   said radially-outer piece being substantially inextensible and continuous, and said radially-outer piece being fitted on said intermediate annular piece; and
   said intermediate annular piece having an outer peripheral surface formed with a circumferential groove configured to receive said radially-outer piece, said groove being of substantially U-shaped cross-section.

16. A device according to claim 12, wherein said intermediate annular piece has a radially-outer peripheral surface that is substantially parallel to an axis of said intermediate annular piece.

17. A device according to claim 12, wherein a distance between ends of said intermediate annular piece when said intermediate annular piece is in a free state is not less than a difference between an outer peripheral dimension of said intermediate annular piece when it is in the free state, and an inner peripheral dimension of said radially-outer piece.

18. A device according to claim 12, wherein said radially-inner piece and said intermediate annular piece are disposed angularly relative to each other in such a manner that respective openings of said radially-inner piece and said intermediate annular piece are diametrically opposite, and an inflation valve fitted to the rim passes through said opening in said radially-inner piece.

19. A device according to claim 12, wherein an inner peripheral surface of said intermediate annular piece has a projection or rib configured to be received in an opening of said radially-inner piece to prevent said intermediate annular piece from rotating on said radially-inner piece.

20. A device according to claim 12, wherein said intermediate annular piece has a wall having an annular projection forming a bearing surface.

21. A device according to claim 12, wherein said intermediate annular piece has a bottom of a channel formed in a radially-outer peripheral surface for receiving said radially-outer piece that is corrugated.

22. A device according to claim 1, wherein said radially-inner piece and said intermediate annular piece have contact surfaces that are frustoconical, at least in part.

23. A device according to claim 22, wherein said radially-inner piece and said intermediate annular piece have contact surfaces that are substantially frustoconical, having an angle at an apex of 30° to 50°.

24. A device according to claim 1, wherein said radially-inner piece is formed of at least two circularly-arcuate curved portions adapted to be placed end to end around the rim.

25. A device according to claim 24, wherein said portions of said radially-inner piece are adapted to be held on the rim by an O-ring received in a groove in an outer surface of said portions.

26. A device according to claim 1, further comprising a layer of rubber adapted to be interposed between the rim and said radially-inner piece.

27. A device according to claim 1, wherein said radially-outer piece has a substantially rectangular cross-section.

28. A device according to claim 1, wherein said radially-outer piece comprises inextensible elements embedded in a rubber material.

29. A device according to claim 28, wherein said radially-outer piece comprises two layers of rubbers of different hardnesses.

30. A device according to claim 1, wherein said radially-inner piece and said intermediate annular piece have contact surfaces that are substantially frustoconical, having an angle at an apex of 30° to 50°.

31. A device according to claim 30, wherein said contact surfaces are formed so that one has at least one circumferential groove and the other has at least one circumferential rib of complementary shape and configured to engage in said groove, said groove and said rib being of asymmetrical cross-section so as to have a rounded or sloping outer side.

* * * * *